April 28, 1970  R. PARTHUM ET AL  3,508,420
CIRCULAR KNITTING MACHINE FOR THE MANUFACTURE
OF RUNPROOF STOCKINGS
Filed Aug. 21, 1967  8 Sheets-Sheet 3

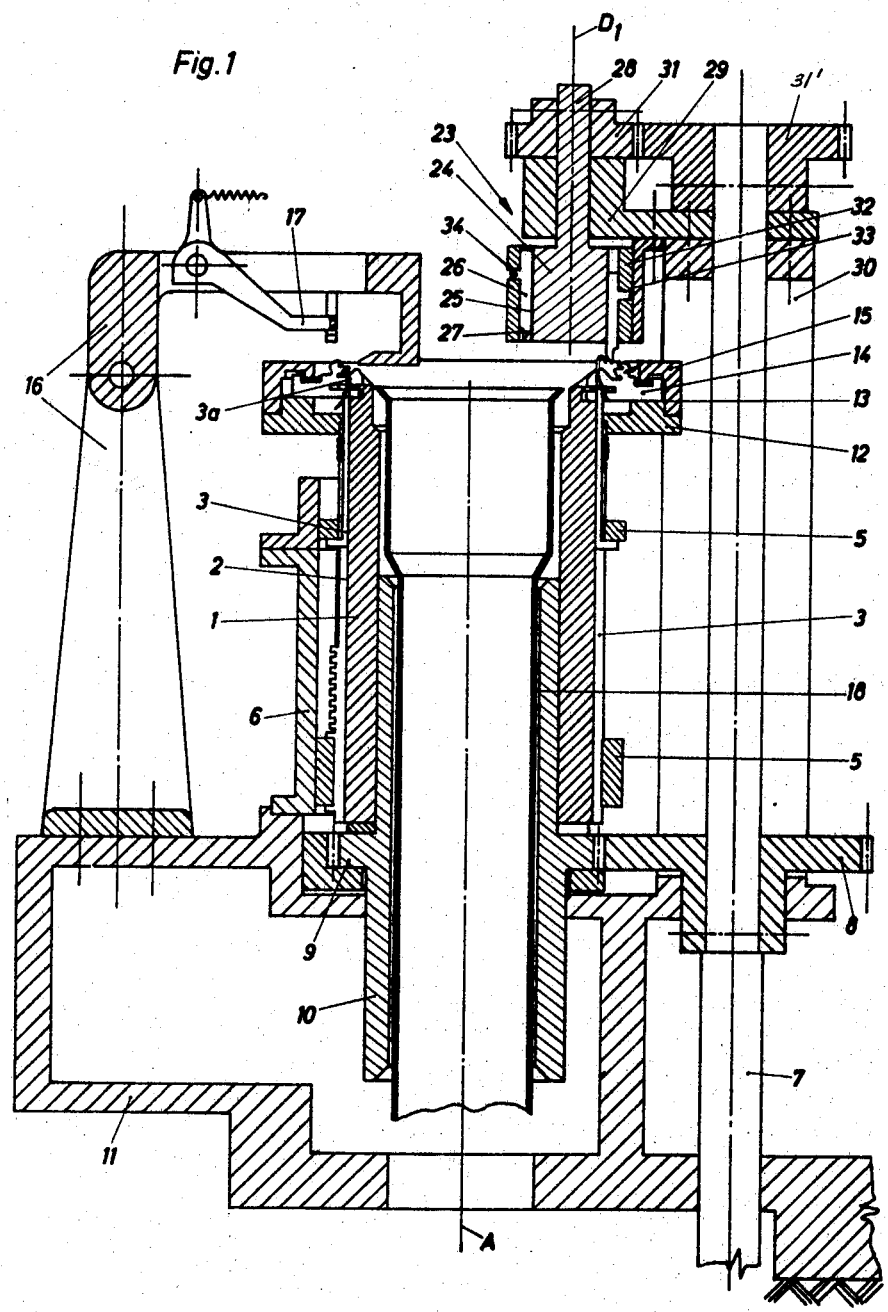

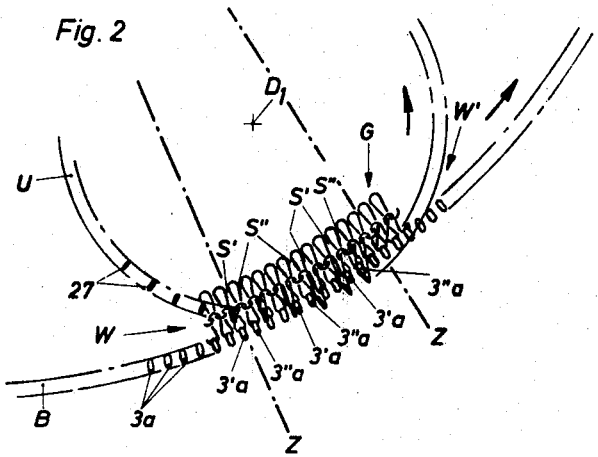
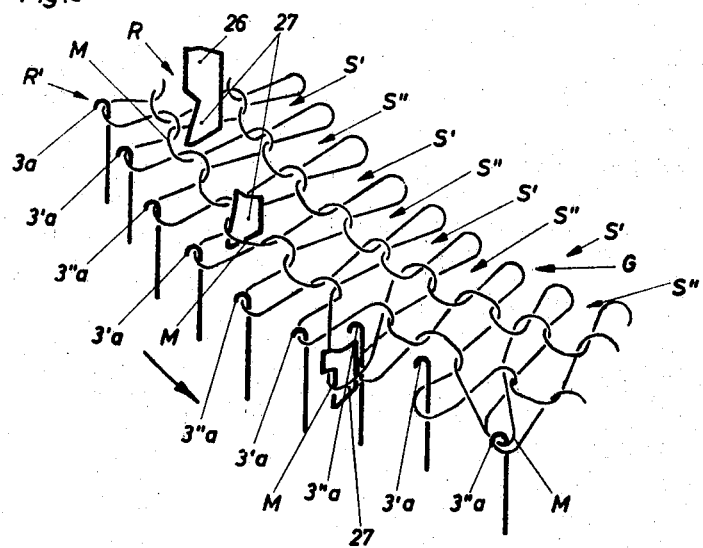

INVENTORS
RICHARD PARTHUM
RICCARDO TENCONI
BY
Woodhams, Blanchard & Flynn
ATTORNEYS

INVENTORS
RICHARD PARTHUM
RICCARDO TENCONI
BY
ATTORNEYS

April 28, 1970 R. PARTHUM ET AL 3,508,420
CIRCULAR KNITTING MACHINE FOR THE MANUFACTURE
OF RUNPROOF STOCKINGS
Filed Aug. 21, 1967 8 Sheets-Sheet 5
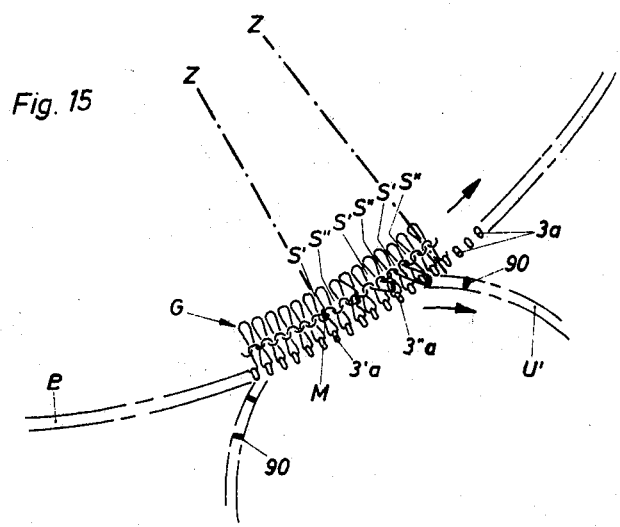
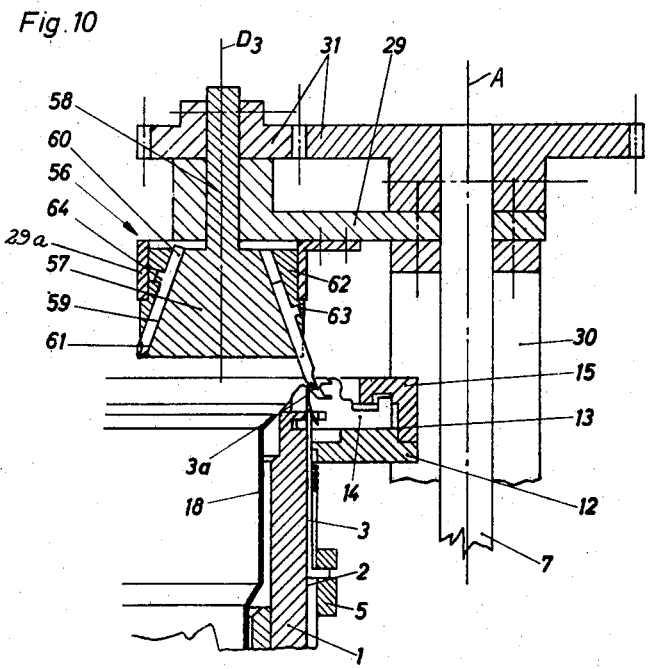
INVENTORS
RICHARD PARTHUM
RICCARDO TENCONI
BY
Woodhams, Blanchard & Flynn
ATTORNEYS April 28, 1970  R. PARTHUM ET AL  3,508,420
CIRCULAR KNITTING MACHINE FOR THE MANUFACTURE
OF RUNPROOF STOCKINGS
Filed Aug. 21, 1967  8 Sheets-Sheet 6
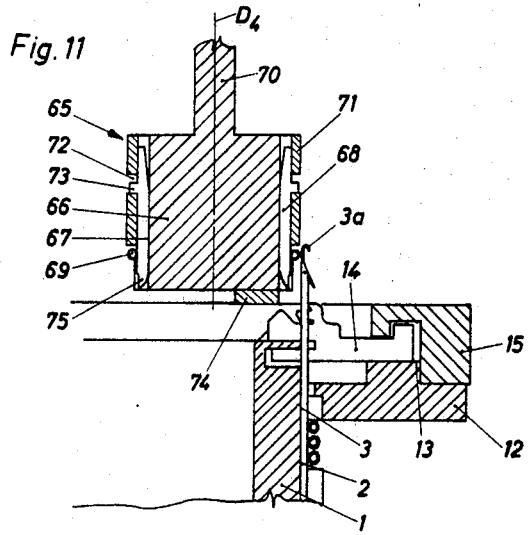
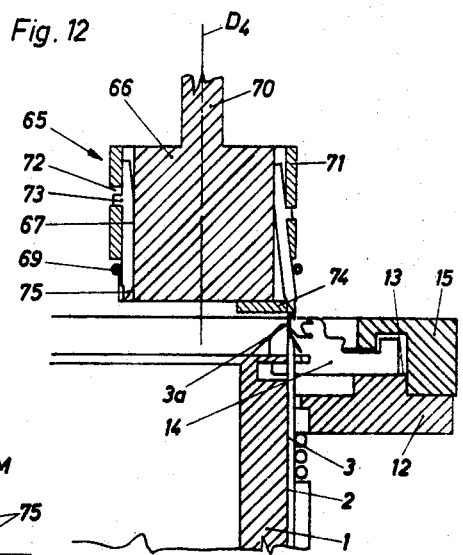
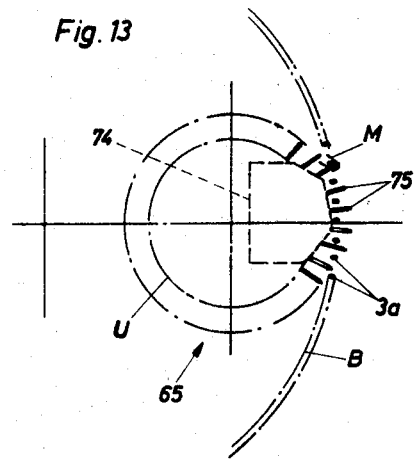
INVENTORS
RICHARD PARTHUM
RICCARDO TENCONI
BY
Woodhams, Blanchard & Flynn
ATTORNEYS

INVENTORS
RICHARD PARTHUM
RICCARDO TENCONI
BY
ATTORNEYS

April 28, 1970   R. PARTHUM ET AL   3,508,420
CIRCULAR KNITTING MACHINE FOR THE MANUFACTURE
OF RUNPROOF STOCKINGS
Filed Aug. 21, 1967   8 Sheets-Sheet 8

INVENTORS
RICHARD PARTHUM
RICCARDO TENCONI
BY
Woodhams, Blanchard & Flynn
ATTORNEYS United States Patent Office 3,508,420
Patented Apr. 28, 1970

3,508,420
CIRCULAR KNITTING MACHINE FOR THE
MANUFACTURE OF RUNPROOF STOCKINGS
Richard Parthum, Copenhagen, Denmark, and Riccardo
Tenconi, Varese, Italy, assignors to Texpatent GmbH,
Fribourg, Switzerland, a corporation
Filed Aug. 21, 1967, Ser. No. 662,062
Claims priority, application Germany, Aug. 26, 1966,
T 31,920
Int. Cl. D04b 15/02
U.S. Cl. 66—95                                                16 Claims

ABSTRACT OF THE DISCLOSURE

A circular knitting machine having transfer means thereon for the lateral transfer of stitches to produce runproof stockings. The transfer means comprises a movable carrier element eccentrically positioned with respect to the needle cylinder, which carrier element has a plurality of substantially axially extending slots containing longitudinally movable transfer elements therein. The circular path of movement of the transfer elements is positioned adjacent to or intersects the circular path of movement of the knitting needles whereby the transfer elements engage the inside of the stitch or loop from above and transfer same radially outwardly into an adjacent row. Further, slight differences in the circumferential speed of the transfer elements and the knitting needles permit the transferred stitch to be moved laterally into an adjacent wale of stitches.

---

This invention relates to a circular knitting machine for the manufacture of runproof stockings. The machine comprises a rotating needle cylinder having individually movable needles controlled in longitudinal slots arranged therein, the heads of said needles passing through a circularly shaped needle path. The machine further comprises a sinker supporting ring surrounding the upper edge of the needle cylinder and synchronously rotating therewith, said sinker supporting ring having movable sinkers radially controllable with respect to said needle cylinder arranged therein. The machine also comprises a carrier which rotates at a circumferential speed slightly different from the circumferential speed of said needle cylinder and has guide slots which move on a circular path due to the rotation of said carrier. Transfer elements are longiudinally movable in the guide slots, said transfer elements being controlled in addition to their circular path movement in a way that their operating ends at the beginning of a stitch transfer zone extending over a part of the needle path engage from inside the knitting stitches of said knitting by an axial movement occurring in the axial direction of the needle cylinder. During the movement through said stitch transfer zone, the operating ends widen said engaged stitches by a radial movement which is essentially radial with respect to said needle cylinder and also move same laterally because of the variable circumferential speed, transferring said stitches at the end of the stitch transfer zone to a needle which is directly or closely adjacent to the needle which has formed the respective stitch.

Runs in stockings are caused, as is known, by tearing of one stitch which sets free the next following stitch in the wale of stitches so that said stitch slides through the stitch holding same and in turn sets free said stitch, etc. until the wale of stitches is completely dissolved. To prevent runs, it is known to take stitches from the wale of stitches during he manufacture of the hose and to transfer said stitches laterally to a needle which is adjacent the needle producing said certain wale of stitches. Thus, stitches are found in each wale of stitches which are not held in the preceding stitch of the same wale but in the stitch of an adjacent wale of stitches. A run can, in the respective wale of stitches, run only to a laterally transferred stitch since the transferred stitch is not freed when the preceding stitch is freed.

For a lateral transfer of stitches, thansfer elements are required in the circular knitting machine which engage a knitted stitch or a stitch hanging on a needle and which widen said stitch laterally so that an adjacent needle can engage same. Said transfer elements must be guided and controlled in a carrier. The problem arises, where would be the most favorable place for said carrier in consideration of the little space provided in a circular knitting machine for hose, and how to control in the simplest manner the complicated movement of the transfer elements.

Special difficulties are encountered in the arrangement of the carrier in the circular knitting machines which are generally used in practice for the manufacture of hose with a double edge. These machines, as is known, have a dial disk within the needle cylinder circumference in he area of its upper edge. Radially movable sinkers are supported in the dial disk. Said sinkers are used as holding members to hold back at least the first row of stitches which later, for producing the double edge on the hose, is again united with the knitting and is set free by the sinkers of the dial disk. The knitting thereby moves between the upper edge of the needle cylinder and the periphery of the dial disk into the needle cylinder. It is thus difficult to provide a carrier which carries transfer elements for engaging stitches of the knitting.

The solution of the problem of the arrangement of the carrier for the transfer elements is for such a circular knitting machine so far only known from U.S. Patent No. 3,110,167 (corresponding to German Patent No. 1,174,-448). The carrier for the transfer sinkers is in said patent constructed as a cylinder which is directly arranged within the wall of the needle cylinder and has a funnel-shaped enlargement at its upper end. The transfer elements are guided from below and slope upwardly and outwardly from outside of the knitting so as to engage the stitches to be transferred. This solution is difficult to work with respect to the structure because long, resilient transfer elements are required which must be moved with great precision in the slot-shaped openings between the upper part of the needle cylinder and the dial disk.

Recently, U.S. Patent No. 3,254,509 (corresponding to German Patent No. 1,169,072) has become known and discloses a circular knitting machine for the manufacture of stockings with a double edge, in which machine the function of holding back at least the first row of stitches for the purpose of producing the double edge is given to the sinkers arranged outside around the needle cylinder, in addition to the actual function of said sinkers which is to cooperate with the needles to produce stitches. Such a circular knitting machine does not require a central dial disk. It has been suggested to arrange the carrier for the transfer sinkers in such a circular knitting machine without a dial disk inside the needle cylinder essentially in the area which otherwise is taken by the dial disk. Such a circular kniting machine corresponds to the type discussed in the introductory paragraph. However, the suggested machine must be provided with special sinkers which can hold back at least the first row of stitches so that the dial disk can be deleted. In the machine of the older type, the carrier is so large that said carrier covers essentially the complete space inside the needle cylinder and rotates coaxially with respect to said needle cylinder. This results in relatively high expenses, a poor accessibility of the interior of the needle cylinder, and the necessity to longitudinally move the transfer elements rather far within their guide slots for radial widening of stitches. Long moving paths are, however, not desired for moving parts of knitting machines because of the control problem connected therewith.

The basic purpose of the invention is to construct a circular knitting machine of the above-described type which is especially simple with respect to structure and with respect to control of the transfer elements, and which is also very safe in operation. This is achieved by the invention in a way that the axis of rotation of the carrier is eccentrically offset relative to the axis of rotation of the needle cylinder in the direction of the stitch transfer zone. Further, the carrier is diametrically sized such that the outer diameter of the circular path of the guide slots extends in the area of the stitch transfer zone close to but spaced from the needle path, said space being changeable due to the eccentricity, the change in space between the circular path of the guide slots and the needle path producing at least a part of the radial movement of the operating ends of the transfer elements within the guide slots.

In the circular knitting machine of the invention, for the manufacture of runproof stockings there can be provided either a relatively small carrier inside and above the needle ring or a carrier of any desired size outside the needle ring. In both cases the area inside the needle cylinder periphery remains well accessible so that other parts can also be provided there. It is also possible to provide a dial disk in spite of the provision of a carrier with transfer elements so that there is no need to use special sinkers in the sinker supporting ring. A further advantage of the machine of the invention is due to the eccentricity of the axis of rotation of the carrier with respect to the axis of rotation of the needle cylinder. The needle path and the circular path of the guiding slots containing the transfer elements together form bent acute angles in the stitch transfer area whereby the space between the circular path of the guide slots and the needle path changes over the length of the stitch transfer zone. The transfer elements thus perform a "natural" radial movement with respect to the needle path, which means a movement without any additional control. Said "natural" radial movement can be used for a radial widening of the stitches. Said effect can be used either to eliminate completely a special radial control for the transfer elements or to decrease same in size, or it can be used to produce a specially large stitch widening in the area of the enlarging space between the needle path and the circular path of the guide slots. Finally, an important advantage of the circular knitting machine of the invention is that the deformation of the stitch to be transferred is done at a relatively small angle with respect to the wale of stitches to which the respective stitch belongs. Deformation of the stitch to be transferred and of the stitch adjacent thereto in the direction of transfer is therefore limited to a minimum. The structure of the knitting is in this manner changed only very litle by the transfer of stitches.

A preferred embodiment of the invention provides that the carrier has a circular-cylindrical shape, that the carrier is arranged higher than the upper edge of the needle cylinder and is provided with guide slots extending in the axial direction in its outer periphery for the transfer elements. The carrier can be manufactured especially easily in this embodiment. To incorporate the guide slots does not create any difficulties in a circular-cylindrical member. The engagement of the operating ends of the transfer elements with the knitting takes place from above. Since the stitches to be engaged by the operating ends are held in an essentially horizontal position by the sinkers or the needles, engagement by the transfer elements with other parts of the knitting, other than the stitches to be transferred, is easily prevented and thus avoids damage to said parts.

It is advantageous in the above-described embodiment if the circular path passed through by the guide slots of the transfer elements intersects in a top view the needle path in the area of the stitch transfer zone, and if a control cam for moving the transfer elements in the longitudinal direction of the guide slots is provided in a stationary cam member surrounding the carrier for controlling the transfer elements. When the circular path described by the guide slots moves over the needle path and then intersects said needle path in two points, the operating ends of the transfer elements move radially with respect to the needle cylinder without any additional radial control on the basis of their "natural movement." Widening of the stitches to be transferred in the radial direction of the needle cylinder thus does not require any additional control. The circular path of the operating ends of the transfer elements must only be adjusted to the needle path in a way that the bent operating ends of the transfer elements can move through the needle path between the needle heads.

The heel of stockings to be produced by the circular knitting machine of the invention is often produced by an oscillating rotation of the needle cylinder. Certain needles are hereby moved upwardly so far that they are out of operation. If the carrier is partially above the needle path, sufficient space must be provided from the upper edge of the needle cylinder to allow the needles to move upwardly during this oscillation. This means, however, that during transfer of stitches the transfer elements must be moved a great distance downwardly.

If "oscillation" of the circular knitting machine is desired, which machine includes a carrier for the transfer elements, it is desirable for the reasons mentioned above if the circular path passed through by the guide slots does not intersect the needle path at any point in a top view and if a stationary control cam arrangement is provided for controlling the transfer elements. Said control cam arrangement has a first control cam for moving the transfer elements in the longitudinal direction of the guide slots and a second control cam for moving the transfer elements in the guide radially to the needle path. In a top view of this embodiment, the carrier is always positioned laterally of the needle path so that upon back and forth swinging of the needle cylinder, for the purpose of producing the heel of the hose, the cylinder needles can be moved upwardly without danger of striking the carrier.

In one preferred embodiment of the invention, the carrier has a truncated conical shape which is tapered in an upward direction. The carrier also is arranged higher than the upper edge of the needle cylinder and has in its outer periphery guide slots extending in an axial direction for the transfer element. This construction of the carrier is advantageous because, by means of a simple longitudinal movement of the transfer elements, the operating ends of said transfer elements are moved both in the axial direction of the needle cylinder and radially to the needle path. In connection with the "natural" radial movement of the transfer elements, which movement is due to the eccentricity, an exact transfer of stitches is obtained by this construction with very short moving paths for the transfer elements.

This embodiment therefore advantageously provides for the control of the transfer elements a control cam which moves the transfer elements in the longitudinal direction of the guide slots and which is arranged in a stationary cam member surrounding the carried. Further, the outermost circumferential line of said carrier does not intersect the needle path in the top view. In the retracted position of the transfer elements, neither the operating ends of the transfer elements nor any other part of the carrier are positioned above the needle path. For "oscillation" of the heel, the cylinder needles can be driven upwardly and it is still not necessary to provide a special radial control for the transfer elements. The last-mentioned embodiment of the circular knitting machine of the invention has a transfer mechanism of extreme simplicity because said transfer mechanism comprises only the actual carrier, the transfer elements, and a cam member for the control of the transfer elements in the longitudinal direction of the guide slots.

As has been mentioned before, it is possible to arrange the carrier for the transfer elements outside the needle cylinder if the area inside and above the needle cylinder is used for other machine parts. It is advantageous in this case if the carrier is a circular disk comprising radially extending guide slots for the transfer elements, said disk being arranged higher than the upper edge of the needle cylinder and the sinker supporting ring, and wherein the transfer elements have downwardly bent operating ends and whereby a stationary control cam arrangement for the transfer elements is associated with the carrier. The transfer mechanism in this embodiment is a flat structural part positioned outside the needle cylinder which thus does not effect the accessibility of the needle cylinder and the inside of said needle cylinder from above. The movement of the operating ends of the transfer elements is essentially the same as in all the other embodiments because the operating ends are bent downwardly so that they engage the knitting from above and from inside of said knitting. Even if the carrier is outside of the needle cylinder, the operating ends of the transfer elements perform a "natural" radial movement with respect to the needle path. As in the other embodiments, the circular path passed through by the guide slots, changes its space from the needle path in the stitch transfer zone and said change in spacing can be used to widen the stitch to be transferred radially.

The last-described modified embodiment provides that the control cam arrangement has an axial control cam for lowering and lifting of the operating ends into and out of the stitches to be transferred and has a radial control cam for moving the transfer elements radially relative to the needle cylinder and the carrier. By controlling the transfer elements in the axial and also in the radial direction relative to the needle cylinder, the carrier can be relatively arranged outside the needle cylinder. This is desirous for this embodiment so as to achieve good accessibility of the needle cylinder.

The disk-shaped carrier is advantageously arranged in a stationary housing whhich is comprised of an upper and lower housing shell. Said upper housing shell has mounted thereto the radial control cam and said lower housing shell has mounted thereto the axial control cam. The actual carrier is thus well protected so that the transfer elements cannot be contaminated. The housing protecting the carrier is at the same time used as a carrier for the control cams.

If the invention is applied in a circular knitting machine which is provided with a dial disk arranged in the area of the upper edge of the needle cylinder and coaxially inside of same and rotating with said needle cylinder, which disk is covered on top by a stationary cover plate and has an annular opening between its outer circumference and the needle path, a specially compact type of construction is obtained in a way that the carrier is pivoted above the cover plate by means of a support part fixedly connected with the cover plate and wherein the transfer elements with their operating ends engage the annular opening to grasp the stitches to be transferred. Thus, in the scope of the invention, the possibility exists of transferring stitches laterally to obtain a runproof knitting in a circular knitting machine commonly provided with a dial disk without requiring long, resilient transfer elements. The transfer elements, guided in the carrier which sits on the cover plate, can be short and rigid.

In order to avoid having to move the transfer elements upwardly after engaging the stitches to be transferred, it is advantageous if the sinkers within the stitch transfer zone are provided with a recess in the upper edge thereof, said recess permitting the operating ends of the transfer elements to be movable therethrough.

The embodiments of the invention are illustrated in the drawings, wherein:

FIGURE 1 is a vertical cross-sectional view of the upper portion of a circular knitting machine of the invention for the manufacture of runproof stockings;

FIGURE 2 is a schematic top view of a portion of the needle-cylinder circumference and of the carrying member from which the movement of the operating ends of the transfer elements can be seen;

FIGURE 3 is a perspective illustration of the process of FIGURE 2;

FIGURE 10 is a vertical cross-sectional view of the upper portion of the preferred embodiment of the circular knitting machine of the invention;

FIGURE 11 is a vertical cross-sectional view of the upper portion of a further modified embodiment of the circular knitting machine of the invention, being adjusted for the "oscillating operation";

FIGURE 12 is a vertical cross-sectional view according to FIGURE 11 showing the transfer elements in the operating position;

FIGURE 13 is a schematic top view on the embodiment of FIGURE 12;

FIGURE 15 is a schematic top view of the stitch transfer operation, similar to FIGURES 2 and 4, for the machine of FIGURE 14;

Figure 14:
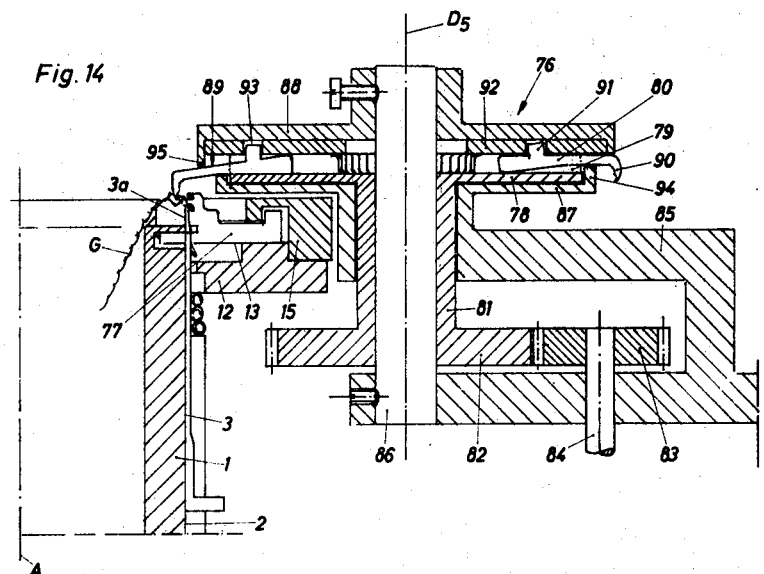
FIGURE 14 is a vertical cross-sectional view of the upper portion of a circular knitting machine of still a further embodiment of the invention.
Figure 16A:
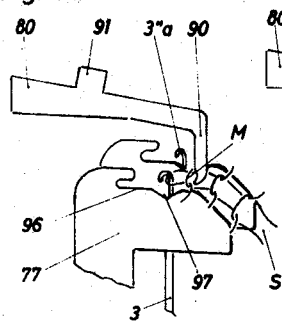
Figure 16B:
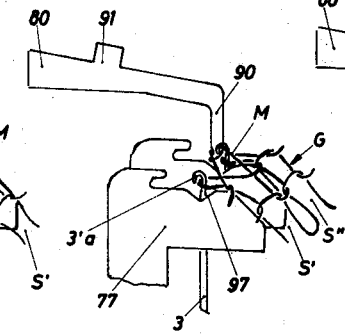
Figure 16C:
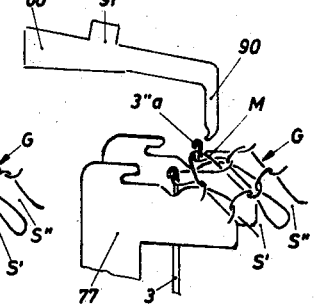
Figure 17A:
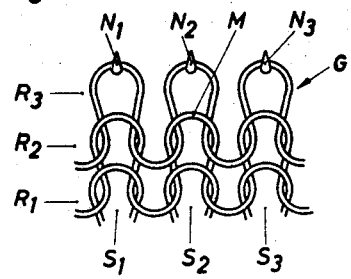
Figure 17B:
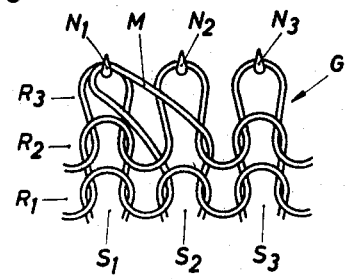
Figure 17C:
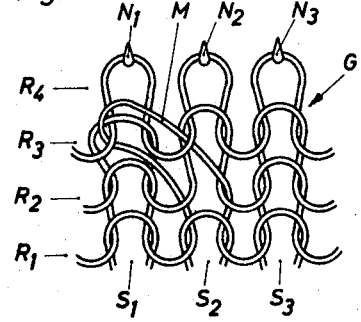
Figure 18:
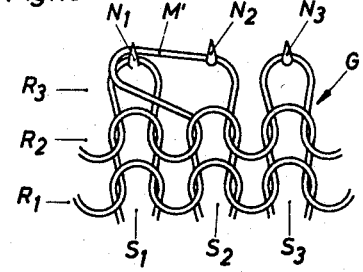

FIGURES 16a–c are perspective views of the stitch transfer operation for the machine of FIGURE 14;

FIGURES 17a–c are enlarged illustrations of three different stages of the stitch transfer operation of the knitting being produced by a circular knitting machine of the invention; and FIGURE 18 is the final stage of the stitch transfer operation of a modified transfer method.

At first it must be discussed which article will be manufactured by this machine. FIGURE 17a illustrates a knitting G commonly used for ladies' hosieries, said knitting comprising wales of stitches $S_1$, $S_2$, $S_3$ etc. and rows of stitches $R_1$, $R_2$, $R_3$. The knitting G is formed in the usual manner by needles $N_1$, $N_2$, $N_3$ in cooperation with sinkers not illustrated in FIGURE 17a. The knitting G, in FIGURE 17a, hangs on the needles by the row of stitches $R_3$.

If in such a knitting a stitch breaks, it sets the following stitch in the wale of stitches free so that said stitch can slide through the next stitch in the wale. This continues until a wale of stitches is dissolved. The reason for such a run is that each stitch in each wale is held by the preceding stitch of the same wale.

The formation of runs can be reduced considerably if stitches are taken from each wale and are transferred laterally to a directly or closely adjacent wale of stitches in a way that they are held in said wale. A run can then only get to the transferred stitch in the respective wale from which said stitch was transferred laterally. The transferred stitch is not freed when the preceding stitch is freed so that the run comes to a stop. The more stitches are transferred laterally in each wale of stitches the shorter is the longest run.

FIGURES 17b, 17c and 18 illustrate the picture of stitches which exists during the transfer of a stitch to an adjacent wale of stitches. For example, the stitch M of the wale of stitches $S_2$ and the row of stitches $R_2$ of FIGURE 17a is engaged by a transfer tool, not illustrated, after said stitch was removed from the needle $N_2$. The transfer tool widens the stitch, inclined with respect to the wale of stitches $S_2$, and transfers said stitch to the needle $N_1$, which needle is directly adjacent to needle $N_2$ which formed said stitch M. This position is illustrated in FIGURE 17b.

After the needles have thrown off the row of stitches $R_3$ the stitch M of the wale of stitches $S_2$ is held in the adjacent wale of stitches $S_1$, namely in the row of stitches $R_3$ which succeeds the row of stitches $R_2$ in which said stitch M originated. Thus a run starting in the wale of stitches $S_2$ does not move further than to the stitch M.

As illustrated in FIGURES 17a–c for the stitch M of the wale $S_2$, in a runproof knitting as is supposed to be manufactured by the circular knitting machine of the invention, a plurality of stitches in each wale of stitches are transferred laterally to an adjacent wale so that the knitting does not allow formation of runs over large areas.

It is, of course, also possible to transfer a stitch laterally within the same row of stitches. This is indicated in FIGURE 18 for a stitch M′ of the wale of stitches $S_2$. There, a transfer tool has widened the stitch M′ still hanging on the needle $N_2$ which forms said stitch, being widened only very slightly in the direction of the wale but much more laterally in the direction of the row of stitches $R_3$ so that the adjacent needle $N_2$ engages said stitch M′. After the row of stitches $R_3$ has been thrown off the needles, the stitch M′ is held in the adjacent wale of stitches $S_1$, however, in the same row of stitches $R_3$.

A knitting as partially illustrated in FIGURES 17a–c and 18 can be produced by a circular knitting machine of the invention.

A needle cylinder is arranged at 1 in the embodiment of FIGURE 1, said cylinder being provided with slots 2 extending in the axial direction in its outer circumference. Needles 3 are guided for longitudinal movement in the slots 2. The movement of the needles is effected by a stationary cylinder cam assembly 5 which is held in a cylindrical cam sleeve 6 and acts in a known manner onto the laterally projecting lugs of the needles 3 for moving same. Needles 3 generally comprise common latch needles, some of the needles having long lugs thereon while other of the needles have short lugs thereon so as to be selectively engageable by the cam assembly 5. The specific structural and operational details of the cam assembly 5 and its cooperation with the needles 3 is fully described in U.S. Patent No. 3,254,509. The needle cylinder 1 is driven by the main drive of the machine (not shown) constructed in the usual manner through a main drive shaft 7, a gear 8 and a drive sleeve 10 provided with a ring gear 9 thereon, said drive sleeve 10 being received within the needle cylinder 1 and being rigidly connected therewith. The mentioned parts are supported on a machine housing 11 which also contains and/or carries the remaining structural parts of the machine. All structural parts not illustrated in the drawings are of common structure and do not refer specially to the invention.

The upper edge of the needle cylinder 1 is surrounded by a sinker supporting ring 12 which is fixed with respect to and rotates synchronously with said needle cylinder 1. Said sinker supporting ring comprises on its upper surface grooves 13 which extend radially toward the needle cylinder 1, said grooves having arranged therein longitudinally movable sinkers 14. The radial movement of the sinkers 14 is effected by a sinker supporting cam-ring 15 which is stationary and is carried by a support arm 16 fixedly connected to the machine housing 11. The support arm 16 has also arranged thereto a yarn guide system, the yarn guide arm being indicated at 17. A tube 18 is arranged inside the needle cylinder 1, the knitted material being removed downwardly through said tube.

The structural parts described so far are, with the exception of the sinker 14, of conventional structure (see U.S. Patent No. 3,254,509) so that a more detailed description is not necessary. It is also not necessary to describe how a hose having the plain loop stitch arrangement of FIGURE 17a is manufactured by the circular knitting machine described above since this is done in a conventional and well-known manner.

Figure 6:
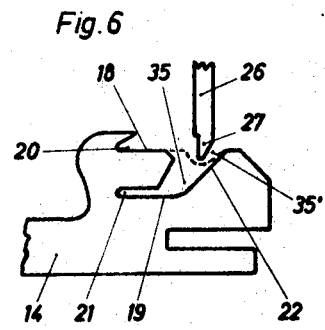
FIGURE 6 is a partial side elevational view of a sinker and the operating end of a transfer element.

Common circular knitting machines for the manufacture of ladies' hosieries are provided with a dial disk coaxially to and slightly above the needle cylinder, said dial disk comprising sinkers to hold back at least the first row of stitches so that the hose can be provided with a double edge. Such a dial disk is not provided in the machine according to FIGURE 1. However, the sinkers 14, as illustrated in FIGURE 6, have an upper cast-off ledge 18 and a lower cast-off ledge 19 each one having adjacent thereto a notch 20 or 21. The first row of stitches are formed on the lower cast-off ledge 19 and are held on the needles 3 by the notch 21. The next row of stitches are produced by the upper cast-off ledge 18 and the notch 20. A cam-like extension 22 of the lower cast-off ledge 19 is used to pull up and to form connecting stitches between the first row of stitches and the row of stitches following thereafter. As soon as the double edge is knitted, the first rows of stitches are freed and are connected with the remaining knitting. This above-described method of producing the double edge is fully discussed in detail in the aforementioned U.S. Patent No. 3,254,509.

In order to transfer stitches in the above-discussed manner in the knitting produced by the machine of FIGURE 1, a transfer mechanism 23 is provided. Said transfer mechanism has for its main part a carrier 24 which has a circular-cylindrical shape according to the embodiment of FIGURE 1 and which has axial guiding slots 25 provided in its outer circumference wherein short, rigid transfer elements 26 with operating ends thereon are guided for longitudinal movement. The carrier 24 is rotatably held in a support member 29 by a pivot pin 28, said support member 29 resting on a second support 30, which support is stationarily supported on the machine housing 11. The arrangement is set up so that the axis of rotation $D_1$ of the carrier 24 is laterally eccentrically offset with respect to the axis of rotation A of the needle cylinder 1. Said eccentric displacing of axis $D_1$ is in the direction of the circumference of the circular needle path, which is passed through by the heads 3a of the needles 3, said needle path being used for the transfer of stitches. The diameter of the carrier 24 is chosen such that the circular path defined by the guiding slots 25 with the transfer elements 26 therein extends, in a top view, close to the path of the needle heads 3a when the needles 3 and the transfer elements 26 are moved through the stitch transfer zone. In the embodiment of FIGURE 1, in which the axis of rotation $D_1$ of the support member 28 is provided within the path of needle heads 3a, this means that the carrier 24 has a smaller diameter than the needle cylinder 1.

The carrier 24 is driven by the main shaft 7 through a pair of gears 31 and 31′ at such a number of rotations that the circumferential speed of the carrier 24 in the area of the guiding slots 25 varies slightly from the circumferential speed of the needle cylinder 1 in the area of its slots 2. Thus, the transfer elements 26 in the stitch transfer zone have a slightly higher or slightly slower path speed than the needle heads 3a. Said variable speed is caused by a suitable selection of the gear ratio between the main shaft 7 and the needle cylinder 1 on one hand and the carrier 24 on the other hand.

The transfer elements 26 are moved in the guiding slots 25 by means of cam member 32 fixedly connected with the stationary support member 29, said cam member 32 having a control cam slot 33 arranged therein which is engaged by the lateral lugs 34 of the transfer elements 26.

As illustrated in FIGURE 1, the measurements of this embodiment of the machine of the invention are chosen such that the circular path of the guiding slots 25 having the transfer elements 26 arranged therein partially penetrates the circular path of the needle heads 3a as seen in the top view.

Figure 4:
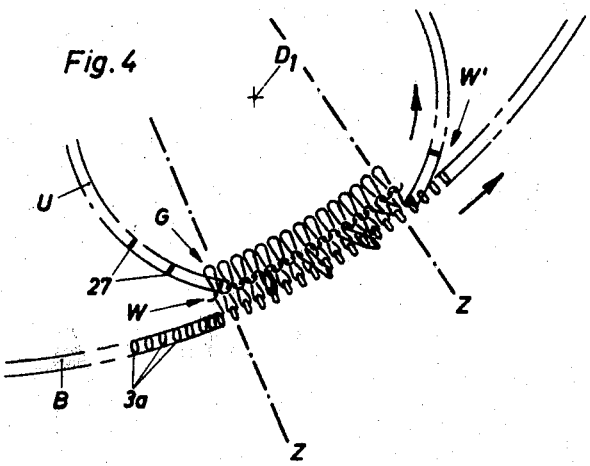
FIGURE 4 is a schematic top view of the transfer operation according to FIGURE 2 wherein the transfer of stitches is in the opposite direction.

The transfer of stitches is done in the machine of FIGURE 1 in the manner described hereinbelow with reference to FIGURES 1 to 4:

FIGURES 2 and 4 indicate in dash-dotted lines a part of the circular path B of the heads 3a of the needles 3. The movement occurs in the counterclockwise direction as indicated by an arrow. Above the needle path B the transfer elements 26 with their operating ends 27 rotate in a circular path U which is also indicated in dash-dotted lines. The movement also occurs in the counterclockwise direction and is slightly slower in FIGURE 2 and slightly faster in FIGURE 4 than the movement of the needle heads 3a on the needle path B.

The stitch transfer zone is positioned between the two lines Z which extend radially with respect to the needle path B. The knitting hangs with the last produced row of stitches in the needle heads 3a, as is illustrated in FIGURE 3. The wale of stitches are alternatively identified as S' and S" and are formed by the needle heads alternatively identified as 3'a and 3"a in cooperation with sinkers, not illustrated in FIGURES 2 to 4.

Figure 5:
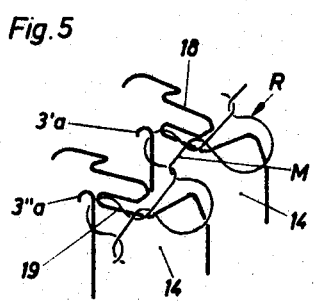
FIGURE 5 is a schematic, perspective view of two sinkers and two needles from which the position of the knitting can be seen before engagement thereof by the transfer elements.

FIGURE 5 illustrates how the stitches of the knitting are held and produced by the needle heads 3'a and 3"a in cooperation with the sinkers 14. The first row of stitches is produced on the lower cast-off ledge 19 of the sinkers 14. After further knitting, the row of stitches is produced in a corresponding manner on the upper cast-off ledge 18 as explained in detail in U.S. Patent No. 3,254,509. FIGURE 5 discloses that the stitches, for example the stitch M, are held by the needle heads and the sinkers in an essentially horizontal position so that the transfer elements can engage the stitches to be transferred from above. One stitch M is supposed to be transferred from each wale of stitches S' to a wale of stitches S". The wales of stitches S' originates on the needle heads 3'a, while the wales of stitches S" are produced by the needle heads 3"a.

As soon as the transfer elements 26 have reached the start of the stitch transfer zone Z—Z on the path U of the guiding slots, said transfer elements are moved downwardly within the guiding slots 25 by the control cam 33 engaging their side lugs 34. During this movement, their operating ends 27 each engage with one stitch M to be transferred within a wale of stitches S', as illustrated in FIGURE 3, wherein there is shown the various positions of the operating ends 27, said positions starting on top and going to the bottom. In the position next to the top position of FIGURE 3, the engaging process with the stitch M is ended. This position corresponds to the beginning of the stitch transfer zone Z—Z in FIGURES 2 and 4. Upon further movement of the operating ends 27 on the path U, said ends come closer to the needle path B since the center of the path U is eccentric to the center of the needle path B. The row of stitches R from which the stitches M are taken moves on a path parallel to the needle path B since the knitting G is carried by the needle heads 3a. As can be clearly understood from FIGURES 2-4, the stitches M are widened radially with respect to the needle path B by the movements of the operating ends 27 and the row of stitches R, which movements are in different directions. Because of the difference in the circumferential speed of the operating ends 27 and the needle heads 3a, the widened stitches are at the same time offset laterally. In FIGURE 2, the stitches are offset opposite the direction of rotation of the needle heads 3'a, while in FIGURE 4 they are offset in the direction of rotation of heads 3a. During this movement, the operating ends 27 moves over the heads 3a of the lowered needles 3. At the same time, they also move over the cast-off ledges of the sinkers 14. This movement can occur without interfering with the operating ends 27 because the sinkers 14 have a recess 35 through which the operating ends 27 can move. Said recess 35 is provided behind the extension 22 in the special sinkers of FIGURES 1 and 6. For usual sinkers, the cast-off ledge of which is illustrated in dash-dotted lines in FIGURE 6, a suitable recess 35' can be provided.

During further progress of the described movement, the operating ends 27 with the stitches M which they pick up fall behind the adjacent needle head 3"a which hurries after the respective needle head 3'a (FIGURE 2), or said operating ends pass the needle head 3"a hurrying ahead of the needle head 3'a (FIGURE 4). At the same time, the ends 27 slowly move outside the needle path B. The adjacent needle with its needle head 3"a can thus be guided upwardly into the stitch M to be transferred as is shown in the lowermost illustrated position of the operating end 27 in FIGURE 3. The transfer elements 26 are then guided upwardly again by the cam 33 and free the stitch M. Said stitch is caught on the adjacent needle head 3"a in a wale S" and in the following row of stitches R'. The stitch transfer operation is thus concluded and the end of the stitch transfer zone Z—Z is reached. The remaining circumference of the needle path is used for knitting in the usual manner.

The control and movement of the transfer elements 26 does not always have to occur as illustrated in FIGURES 2-4. It is also possible to engage each wale of stitches and to transfer one stitch therefrom to an adjacent wale. Furthermore, the stitch transfer zone Z—Z can also be angularly displaced with respect to the position illustrated in FIGURES 2 and 4. In the illustrated arrangements of the stitch transfer zone, the angular space W between the converging paths U and B is used to widen the stitch. However, the angular space W' can also be used for this. Finally, it is also possible to obtain a pattern in the hose by transferring stitches laterally.

Figure 7A:
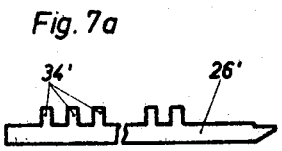
FIGURE 7 and FIGURE 7a are side elevational views of two embodiments of transfer elements.
Figure 7:
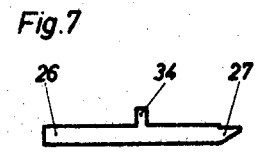

In stead of the transfer elements 26 with only one side lug 34, transfer elements having several side lugs can be used. Such a transfer element 26' is illustrated in FIGURE 7a. As illustrated, said transfer element comprises a plurality of side lugs 34' which cooperate with a corresponding number of control cams formed in the cam assembly 5. Said control cams are switched on as desired in the usual manner by means of pattern devices. Such a cam assembly having movable control cams thereon selectively engageable with different cam lugs is fully described in U.S. Patent No. 3,254,509.

Figure 8:
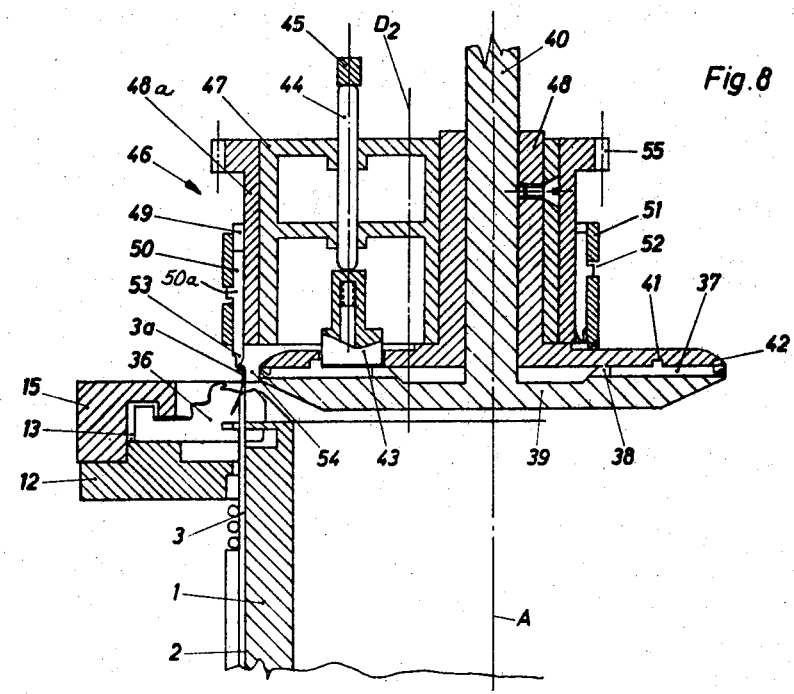
FIGURE 8 is a vertical cross-sectional view of the upper portion of a modified embodiment of the circular knitting machine of the invention.
Figure 9:
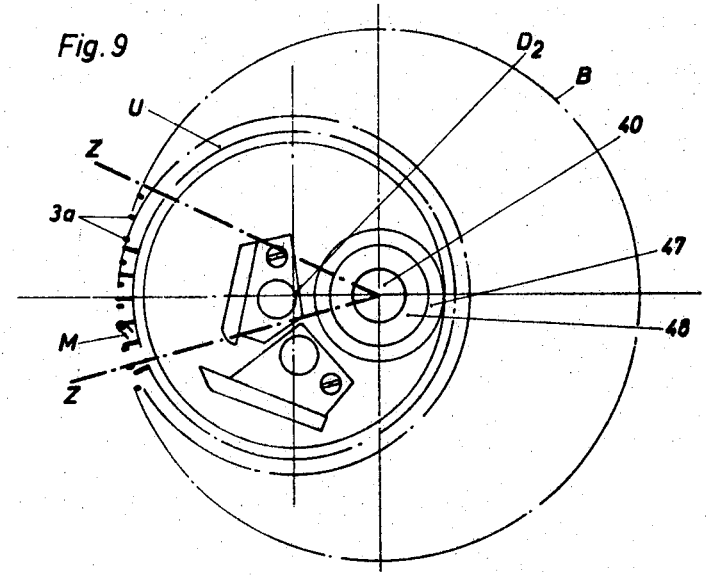
FIGURE 9 is a schematic top elevational view of the machine according to FIGURE 8.

FIGURES 8 and 9 show that the invention allows the provision of a stitch transfer mechanism in a circular knitting machine having a central dial disk. The circular knitting machine illustrated in said figures corresponds with respect to its conventional parts to those of FIGURE 1. Parts which are the same as in FIGURE 1 are identified by the same reference numerals. In place of the special sinkers 14 of FIGURE 1, the machine of FIGURES 8 and 9 provides common sinkers 36 which have only a single function, that being cooperating with the needles during the stitch production. The sinkers 37, in a known manner, have the function of holding back the first rows of stitches in order to produce a double edge, said sinkers 37 being guided for longitudinal movement in radial slots 38 formed in the dial disk 39. Said dial disk is arrange adjacent the upper edge of the needle cylinder 1 and is positioned inside said cylinder and is rotated synchronously with the needle cylinder 1 through a drive shaft 40 coming from above. To control the movement of the sinkers 37, a control cam slot 41 is provided in a stationary cover plate 42, which plate 42 is arranged above the dial disk 39 and has a dial cam 43 thereon which can be operated by means of a plunger 44 and a cam ring 45. The function of the sinkers 37 in forming a double edge is well known and has been discussed above.

In order to make it possible to transfer stitches of the knitting in such a machine, a transfer mechanism indicated generally at 46 is provided. Said transfer mechanism has a rotatable cylindrical support member 47 which is fixed on a sleeve 48 projecting from the cover disk 42. A cylindrical carrier 48a is rotatably mounted about the support member 47, said carrier having axial guide slots 49 in its outer circumference for transfer elements 50. The support member 47 is offset with respect to the axis of rotation A of the needle cylinder 1 and dial disk 39, the axis of rotation $D_2$ being offset eccentrically in the direction of the stitch transfer zone Z—Z. The transfer elements 50 are movably controlled in the axial direction of the carrier 48a by means of a cam member 51 having a control cam slot 52, said cam member 51 being fixedly connected to the cover disk 42. The cam slot 52 is engaged by the side lugs 50a formed on the transfer members 50. The needle path is again identified as B in FIGURE 9, and the path of the transfer elements 50 as U. The operation corresponds to the operation of FIGURE 2 or 4 whereby the transfer elements 50 with their operating ends 53 move within a ring opening 54 in the area of the stitch transfer zone Z—Z, said opening remaining between the outer circumference of the dial disk 39 and the needle path 3. The drive of the carrier 48a occurs in a similar manner as in the embodiment of FIGURE 1, namely by a nonillustrated main shaft and through a gear 55 on the upper edge of the carrier 48a.

On the cover disk 42 and on the stationary support member 37 there can be arranged further machine parts, for example, yarn cutting and yarn clamping devices which, however, are not directly connected with the invention.

The preferred embodiment of FIGURE 10 differs from the one of FIGURE 1 only in the shape and arrangement of the carrier for the transfer elements and of the parts directly associated with said carrier. The parts which correspond to the embodiment of FIGURE 1 are again identified by the same reference numerals.

This again is a machine without a central dial disk. However, a dial disk could be provided in the embodiment of FIGURE 10.

The machine of FIGURE 10 comprises a stitch transfer mechanism 56 which contains a carrier 57. As illustrated in FIGURE 10, the carrier 57 has a truncated conical shape tapered in an upward direction and connected to a pivot 58 for the pivotal drive. Guiding slots 59 are provided in the outer circumference of the carrier 57, said guilding slots having longitudinally movably arranged therein transfer elements 60 with operating ends 61. To control the longitudinal movement of the transfer elements 60, a cam member 62 is provided, said cam member being fixedly connected within the fixed sleeve 29a mounted on the stationary part 29. The cam member 62 comprises a control cam slot 63 which is engaged by the side lugs 64 of the transfer elements 60.

The carrier 57 is again arranged slightly higher than the upper edge of the needle cylinder 1 and its axis of rotation $D_3$ is eccentrically offset with respect to the axis of rotation A of the needle cylinder in the direction of the stitch transfer zone. The outer circumference of the carrier 57 and the cam member 62 fitted to said carrier are positioned, in a top view, within the path of the needles 3.

The operation is principally the same as illustrated in FIGURE 2 or 4. One must take into consideration the circular path which is described by the lower ends of the guiding slots 59 upon rotation of the carrier 57, which path is offset inwardly from the needle path so that it no longer intersects the needle path. However, in spite of this, stitch transfer occurs since the operating ends 61 of the transfer elements 60, which ends are moved downwardly by the cam 63 in the stitch transfer zone, move radially to the needle path by means of their "natural" movement during rotation of the guiding slots 59. Further, in the embodiment of FIGURE 10, the transfer elements 60 are moved downwardly and outwardly in their operating positon whereby the outwardly directed component of movement supports the widening the stitches to be transferred. This radial movement, in addition to the "natural" radial movement, is sufficient to widen the stitches outwardly far enough to allow their lateral transfer in spite of positioning the path of the guiding slots 59 inside the needle path. The special advantage of the embodiment of the machine according to FIGURE 10 is that no part of the transfer mechanism 56 is positioned above the path of the needles 3 when the transfer elements 60 in the area of the stitch transfer zone are completely upwardly retracted into the slots 59. This can be done by rotation of the cam member 62. In this position of the transfer elements, the needles 3 can be moved as far upwardly within said slots 2 as desired so that the needle cylinder can be moved by an oscillating gear to produce the hose heel. The machine according to FIGURE 10 has means (not illustrated) which, upon drivingly interconnecting the needle cylinder 1 to an oscillating gear, permits rotational displacement of the cam member 62 so that the transfer elements 60 in the stitch transfer zone are retracted. For example, the cam member 62 could be fixedly connected to sleeve 29a by means of a radial key member such as a set screw, loosening of the set screw permitting the cam member 62 to be manually angularly displaced to retract the transfer elements 60. During said movement of the cam member 62, the carrier 57 is stationary.

In the embodiment of FIGURES 11–13 there also exists the possibility of operating the needle cylinder by an oscillating gear. The conventional structural parts in this embodiment again correspond to the parts of FIGURE 1 and are identified by the same reference numerals. The machine according to FIGURES 12 and 13 comprises a transfer mechanism 65 which has a cylindrical carrier 66 with axial circumferential slots 67. Longitudinally movable transfer elements 68 are arranged in said circumferential slots, said transfer elements being clamped together inwardly against the circumference of the carrier 66 by a spring ring 69. The carrier 66 is driven through an axle-end pivot 70, the axis of which is indicated at $D_4$ in a manner similar to the carrier 24 of FIGURE 1 and the carrier 57 of FIGURE 10. The circumferential speed of the carrier 66 is here again slightly higher or slower than the path speed of the needle heads 3a during rotation of the needle cylinder 1. To control the transfer elements 68 in the axial direction of the guiding slots 67, a cam sleeve 71 having a control cam slot 72 is used, said control cam slot being engaged by laterally projecting lugs 73 of the transfer elements 68. The cam sleeve 71 is held stationary during the transfer of stitches by means (not shown) similar to the mounting structure illustrated on FIGURE 10. However, the cam sleeve can be rotatably displaced to retract the transfer elements from the stitch transfer zone when the needle cylinder is drivingly interconneced to an oscillating gear. The transfer elements 68 are, in addition to their longitudinal movement in the guiding slots 67, movable radially of the carrier 66. A cam plate 74 is provided which is transversely movable underneath the carrier 66 so as to act upon the operating ends 75 of the transfer elements 68.

The axis of rotation $D_4$ is again eccentrically offset with respect to the axis of the needle cylinder 1 in the direction of the needle transfer zone. The carrier 66 is positioned within the path of the needle head 3a and is positioned in the embodiment of FIGURES 11 to 13 in a way that the path U described by the guiding slots 67 (FIGURE 13) extends adjacent the path B of the needle heads 3a.

Principally here again the operation of the machine according to FIGURES 1 to 13 corresponds to the operation of FIGURE 2 or 4. Here too the space changing in the stitch transfer zone between the path U and the path B and the inclined acute angle thus formed between the paths is used for the stitches to be transferred. The "natural" movement of the operating ends 75 of the transfer elements 68 would, however, not be sufficient to widen the stitches to be transferred beyond the needle path B. The operating ends 75 which are guided by the cam 72 are therefore moved radially outwardly by the cam plate 74 said cam plate is in the operating position according to FIGURES 12 and 13.

When said cam plate 74 is retracted to the position illustrated in FIGURE 11, the spring ring 69 holds the transfer elements 68 in the guiding grooves 67. Said transfer elements are at the same time moved upwardly by rotation of the cam sleve 71 in the stitch transfer zone. Thus, the needles 3 can again be moved upwardly so that their heads 3a in the stitch transfer zone are clearly positioned higher than the lower edge of the carrier 66. In this position, the oscillating gear can again be used and the heel of the hose can be produced.

Control of the transfer elements 68 in two directions allows on one hand a still more exact engagement of the operating ends of said transfer elements with the stitches to be transferred; however, on the other hand, said control increases the structural expense slightly.

As regards mounting cam plate 74 with respect to the carrier 66, many different mounting means could be used. For example, stationary cam sleeve 71 could have a portion integrally formed thereon and extending downwardly below the lower surface of the carrier 66, which portion could then have a horizontal portion fixed thereto and extending between the bottom of the carrier 66 and the top of the needle cylinder 1. The horizontal portion could have a radial slot therein for slideably mounting the cam plate 74. A threaded adjustment screw could be used to interconnect the cam plate 74 and the horizontal portion to permit manual adjustment of the cam plate relative to the transfer elements 68, such adjustment screws being well known.

FIGURE 14 illustrates still another embodiment which uses a stitch transfer mechanism 76, the eccentricity between the axis of rotation a of the needle cylinder 1 and the axis of rotation $D_5$ of the transfer mechanism is selected to be so large that the transfer mechanism is positioned outside the needle cylinder. The conventional parts of the machine again correspond to the embodiment according to FIGURE 1 and have the same reference numerals. The sinkers 77 guided in slots 13 in the sinker supporting ring 12 are, contrary to FIGURE 1, of a conventional shape because the machine according to FIGURE 14 can easily provide a dial disk (not illustrated) to form the double edge. Of course, the special sinkers 14 of FIGURE 1 could also be used.

The transfer mechanism 76 comprises a disk-shaped carrier 78 with radially extending guide slots 79 which have longitudinally movable transfer elements 80 arranged therein. The carrier 78 is, as mentioned above, outside the needle cylinder 1 and is slightly higher than the upper edge of said needle cylinder and is also arranged higher and partially above the sinker supporting ring 12 and the sinker supporting cam ring 15. The carrier 78 has a downwardly directed sleeve 81 connected to a gear 82. A gear 83 is in meshing engagement with said gear 82, said gear 83 being fixed on an intermediate shaft 84, which in turn is driven by the main drive shaft of the machine. The gear ratio is again chosen in a way that the circumferential speed of the carrier 78 varies slightly from the circumferential speed of the needle cylinder 1.

The transfer mechanism is carried by a support member 85 which has a shaft 86 rotationally fixed therein, said shaft penetrating into the sleeve 81. The support member 85 forms a lower housing shell 87 which together with an upper housing shell 88 mounted to the shaft 86 forms a housing with a circumferential opening 89 receiving the carrier 78. Said carrier 78 is well protected against contamination in said housing.

The transfer elements 80 have hook-shaped, downwardly bent operating ends 90 and an upwardly extending lug 91.

To control the transfer elements 80 radially within the carrier 78, a cam disk 92 with a control cam slot 93 is mounted in the upper housing shell 88, the lugs 91 of said transfer elements 80 engaging said control cam slot. The operating ends 90 of the transfer elements 80 are, moreover, controlled in an axial direction of the needle cylinder 1 or the carrier 78. For this purpose, a first control cam 94 is arranged on the outer edge of the lower housing shell 87 and a second control cam 95 is arranged on the outer edge at the upper housing shell 88. The outer ends of the transfer elements are guided between said two control cams.

Stitches are transferred by the transfer mechanism 76 in the manner discussed hereinafter and as illustrated in FIGURES 15 and 16a–c:

The needle heads 3a again rotate on a path B and produce in the usual manner together with the sinkers 77 the knitting G. In a stitch transfer zone Z—Z, stiches M are again supposed to be transferred from wales of stitches S' to an adjacent wale of stitches S''. Above the needle head path B, the operating ends 90 of the transfer elements 80 rotate on a path U' in the same direction at a slightly higher path speed. The path U' of the operating ends 90 of the transfer elements partially intersects in a top view of the needle path B. The horizontal space between the paths is changed through the stitch transfer zone Z—Z because of the eccentricity of the axis of rotation $D_5$ with respect to the axis of rotation A. In addition, the change in space is also due to the radial control of the transfer elements 80 by the control cam 93. As soon as an operating end 90 of a transfer element 80 is provided at the border of the stitch transfer zone above a stitch M to be transferred, the operating end is guided downwardly by suitable shaping of the control cams 94, 95 and engages the stitch M prepared by the sinkers 77 in the manner as illustrated in FIGURE 16a and FIGURE 15. Upon further movement, the operating end 90 pulls the stitch M outwardly from its original path parallel to the needle path B. This movement is partially due to the fact that the path U', because of the eccentricity, extends outwardly from the engaging point of the stitch M with respect to its path. However, the widening is also partially effected by retracting the transfer elements 80 to the center of the carrier 78 by means of the control cam 93. The stitch to be transferred is at the same time, because of the higher path speed of the operating ends 90 with respect to the needle heads 3a, moved forwardly in the direction of rotation until an adjacent needle head 3''a is passed. The adjacent needle 3''a is then moved upwardly by means of the cylinder cam (such as cam 5 of FIGURE 1) and engages the wide stitch M. This position can be clearly seen in FIGURE 16b. The operating end 90 of the respective transfer element 80 is then lifted by the two control cams 94, 95 as the end of the stitch transfer zone is reached. The transferred stitch M remains hanging on the head 3''a of the adjacent needle and is dropped during the next stitch production together with the first stitch hanging on said head. The stitch M thus is held in the adjacent wale S''.

It would, of course, also be possible in the embodiment of the machine according to FIGURE 14 to rotate the operating ends 90 of the transfer mechanism slower than the needle heads 3a. The transfer of the stitches would then take place in opposite directions. Furthermore, a radial control of the transfer elements in the embodiment according to FIGURE 14 could be omitted if desired. The illustrated embodiment has, however, the advantage that by adjustment of the cam disk 92, the transfer elements 80 in the machine transfer zone Z—Z can be moved into the retracted position so that the needles 3 can be moved partially upwardly for the oscillating movement of the needle cylinder 1 required for the heel production.

With respect to the sinkers 77, it must be pointed out that said sinkers are again provided on their cast-off ledge with a recess 97 through which the operating ends 90 move during lateral transfer of the stitches. The needles also are, during the sideways movement of the stitch to be transferred, lowered in the machine according to FIGURE 14.

It is again emphasized that the nonillustrated and described parts of the circular knitting machine are of conventional and known structure. The needle cylinder, the needles, the sinkers and the other conventional structural parts can, of course, be constructed differently from the embodiments illustrated in the drawings in the scope of the state of the art known today. Furthermore other constructions and arrangements of the transfer mechanism could also be used. For example, it would be possible to arrange a transfer mechanism as illustrated in FIGURES 1 or 10 similarly to the transfer mechanism according to FIGURE 14. The stitches are then not pushed from inside outwardly by the transfer elements, but are pulled by same, which transfer elements would in a corresponding manner like the transfer elements 80 engage the stitch to be transferred.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A circular knitting machine for the manufacture of runproof stockings comprising:
   a rotating needle cylinder having individually movable needles controlled in longitudinal slots arranged therein, the heads of said needles passing through a circularly shaped needle path;
   a sinker supporting ring surrounding the upper edge of the needle cylinder and synchronously rotating therewith, said sinker supporting ring having radially movable sinkers arranged therein;
   a carrier comprising a circular disk rotatable at a circumferential speed slightly different from the circumferential speed of said needle cylinder and having radially extending guide slots which move on a circular path due to the rotation of the disk, said disk being arranged higher than the upper edge of the needle cylinder and the sinker supporting ring;
   transfer elements having downwardly bent operating ends longitudinally movable in the guide slots, said transfer elements being controlled in addition to their circular path movement in a way that their operating ends, at the beginning of a stitch transfer zone extending over a part of the needle path, engage from inside the knitting stitches of said knitting by a movement occurring at least partially in the axial direction of the needle cylinder, and whereby during the movement through said stitch transfer zone said operating ends widen said engaged stitch by movement which is essentially radial with respect to said needle cylinder and also move same laterally because of the variable circumferential speed and transfers said stitch at the end of the stitch transfer zone to a needle which is directly or closely adjacent to the needle which has formed the respective stitch;
   stationary control cam means associated with said carrier and coacting with said transfer elements for controlling the movement thereof; and
   the axis of rotation of the carrier being eccentrically offset relative to the axis of rotation of the needle cylinder in the direction of the stitch transfer zone, and the carrier having a diameter such that a portion of the outer circumference of the guide slot circular path within the stitch transfer zone extends near the needle path, said portion of said guide slot path being nonuniformly spaced from said needle path due to the eccentricity, the nonuniform space between the guide slot circular path and the needle path causing radial movement of the operating ends of the transfer elements relative to the needle path.

2. A circular knitting machine according to claim 1, wherein the axis of rotation of the carrier is positioned outside of the needle path.

3. A circular knitting machine according to claim 1, wherein the control cam means has an axial control cam for lowering and lifting the operating ends into and out of the stitches to be transferred and having a radial control cam for moving the transfer elements radially with respect to the needle cylinder and with respect to the carrier.

4. A circular knitting machine for the manufacture of tubular knitted fabric, comprising:
   knitting means for producing a tubular knitted fabric having a plurality of loops in a row and a plurality of adjacent rows whereby the aligned loops adjacent rows define a plurality of wales which extend substantially transversely to the extending direction of the rows;
   said knitting means inncluding a hollow needle cylinder and means rotatably mounting same, and first drive means connected to said needle cylinder for rotating same;
   said needle cylinder having a plurality of elongated slots therein and a plurality of knitting needles slideably mounted in said slots, said needles having knitting heads adjacent one end thereof with said heads defining a circular needle path, the heads of said needles being positioned adjacent one end of said needle cylinder and at least some of said heads being engaged with an edge row of the knitted fabric with the remainder of the tubular knitted fabric extending inside the needle cylinder in a direction away from the one end thereof;
   transfer means for engaging from the inside of the tubular knitted fabric a loop in a row previously cast off from the needles and for moving said loop substantially (1) transversely from said cast-off row toward said needles and (2) laterally along said cast-off row from one wale to an adjacent wale for engaging said loop on one of said needles;
   said transfer means including a carrier and means rotatably mounting same adjacent said one end of said needle cylinder, said carrier being rotatable about an axis substantially parallel to and laterally offset from the rotational axis of said needle cylinder;
   said carrier having a plurality of guide slots formed therein and a plurality of substantially rigid transfer elements slideably mounted within said slots, said transfer elements having a loop engaging portion defining as said carrier rotates a substantially circular closed path, a portion of said closed path being positioned closely adjacent a portion of the needle path so as to define a loop transfer zone;
   the loop engaging portion of said transfer elements being movable between an inoperative position spaced from the knitting and an operative position wherein the loop transfer portion is adapted to enage a loop of the knitted fabric when within the loop transfer zone, the loop engaging portion when in the inoperative position outside the loop transfer zone being spaced radially from the edge row of the tubular knitted fabric; and
   sinker means including movable sinkers disposed adjacent said one of said needle cylinder, said sinkers including clearance means for permitting lateral movement of said transfer elements relative to said sinkers when said transfer elements are in the operative position for permitting one of said transfer elements to engage said loop in said cast-off row to transfer same transversely and laterally into an adjacent row and wale;

said loop transfer means including control means for moving said transfer elements from said inoperative to said operative position whereby the loop engaging portions engage, from the inside of the knitted fabric, loops of the cast-off row and move the engaged loops transversely relative to said cast-off row radially outwardly toward said knitting needles for engaging said loops with respective ones of said knitting needles, said control means also including second drive means rotatably driving said carrier at a rotational speed such that the loop engaging portion of said transfer elements rotates at an angular velocity different from the angular velocity of the heads of the knitting needles so as to move the engaged loops laterally into an adjacent wale.

5. A circular knitting machine according to claim 4, wherein the axis of rotation of the carrier lies within the needle path.

6. A circular knitting machine according to claim 4, comprising a dial disk arranged in the area of the upper edge of the needle cylinder and coaxially therein and rotating with said needle cylinder, said dial disk being covered in an upward direction by a stationary cover plate and providing an annular opening between its outer periphery and the needle path, and wherein the carrier is rotatably mounted above the cover plate by means of a support part rigidly connected to the cover plate and wherein the transfer elements with loop engaging portions extend into the annular opening to pick up loops to be transferred.

7. A circular knitting machine according to claim 4, wherein the carrier includes a cylindrical member positioned adjacent to but above the upper edge of said needle cylinder, said cylindrical member being rotatable about its longitudinal axis and having a plurality of circumferentially spaced, axially extending guide slots formed on its outer surface for receiving said transfer elements therein.

8. A circular knitting machine according to claim 7, wherein the axis of rotation of said cylindrical member lies within the circular needle path, and wherein the diameter of the closed path defined by said loop engaging portions is less than or equal to the radius of said circular needle path.

9. A circular knitting machine according to claim 7, wherein movement of said transfer elements between said operative and inoperative positions occurs in an axial direction relative to said carrier, and said control means including cams means cooperating with said transfer elements for axially moving same within said guide slots between said operative and inoperative positions, the closed circular path defined by the loop engaging portions of said transfer elements when viewed in the axial direction of said needle cylinder intersecting said circular needle path within said loop transfer zone.

10. A circular knitting machine according to claim 7, wherein the closed path defined by the loop engaging portions of the tranfer elements when viewed in the axial direction of the needle cylinder is circular and lies within and does not intersect the needle path when the transfer elements are in the inoperative position, and said control means including stationary cam means coacting with said transfer elements for moving same from said inoperative to said operative position, said cam means including a first cam for moving said transfer elements axially within said guide slots and a second cam for moving to the transfer elements radially relative to the guide slots and relative to the needle cylinder where the loop engaging portions of said transfer elements when in said operative position generate a path which intersects the needle path.

11. A circular knitting machine according to claim 4, wherein said carrier comprises a truncated conical-shaped member positioned adjacent to and above the upper edge of the needle cylinder, said conical-shaped member being rotatable about its longitudinal axis and having a plurality of circumferentially spaced, longitudinally extending guide slots formed on its outer periphery for receiving said transfer elements therein.

12. A circular knitting machine according to claim 11, wherein said control means includes stationary cam means coacting with said transfer elements for moving same longitudinally within said slots between said operative and inoperative positions, movement of said transfer elements within said slots causing the loop engaging portion thereof to move both axially and radially relative to said circular needle path, the closed path generated by the loop engaging portions of said transfer elements when in the inoperative position being circular and lying entirely within and not intersecting the circular needle path when viewed in the axial direction of said needle cylinder, movement of the loop engaging portions of said transfer element to said operative position causing said loop engaging portions to interesect said needle path.

13. A circular knitting machine according to claim 4, wherein the diameter of the closed path is substantially smaller than the diameter of the circular path.

14. A circular knitting machine according to claim 13, wherein said control means causes substantially linear movement of said transfer element from said inoperative to said operative position solely in the lengthwise direction of said guide slots.

15. A circular knitting machine according to claim 14, wherein the axis of rotation of said carrier lies within the circular needle path, and the guide slots formed on said carrier are substantially straight and elongated in a direction substantially parallel to the axis of rotation of said carrier, and said control means permitting only linear movement of said transfer elements in the elongated direction of said guide slots.

16. A circular knitting machine according to claim 14, wherein the carrier includes a rotatable member positioned adjacent to but above the upper edge of said needle cylinder, sadi rotatable member being rotatable about its longitudinal axis and having a plurality of circumferentially spaced guide slots formed therein and extending substantially in a longitudinal direction thereof, and the longitudinal axis of rotation of said rotatable member lying within the circular needle path.

References Cited

UNITED STATES PATENTS

| | | | |
|---|---|---|---|
| 802,650 | 10/1905 | LaRock | 66—97 |
| 1,095,164 | 4/1914 | Musgrove | 66—95 |
| 1,770,469 | 7/1930 | Grieve | 66—107 XR |
| 2,051,724 | 8/1936 | Larkin | 66—95 XR |
| 2,060,020 | 11/1936 | Boaler | 66—95 |
| 2,757,527 | 8/1956 | Lawson | 66—107 |
| 3,254,509 | 6/1966 | Tenconi | 66—108 XR |

FOREIGN PATENTS 200,116    7/1908    Germany.

OTHER REFERENCES

German printed application 1,083,475 (1960).

WM. CARTER REYNOLDS, Primary Examiner

U.S. Cl. X.R.

66—107